April 26, 1938.  B. C. SEATON  2,115,045
VEHICLE FRAME AND BODY MOUNTING CHASSIS
Filed July 24, 1936  2 Sheets-Sheet 1
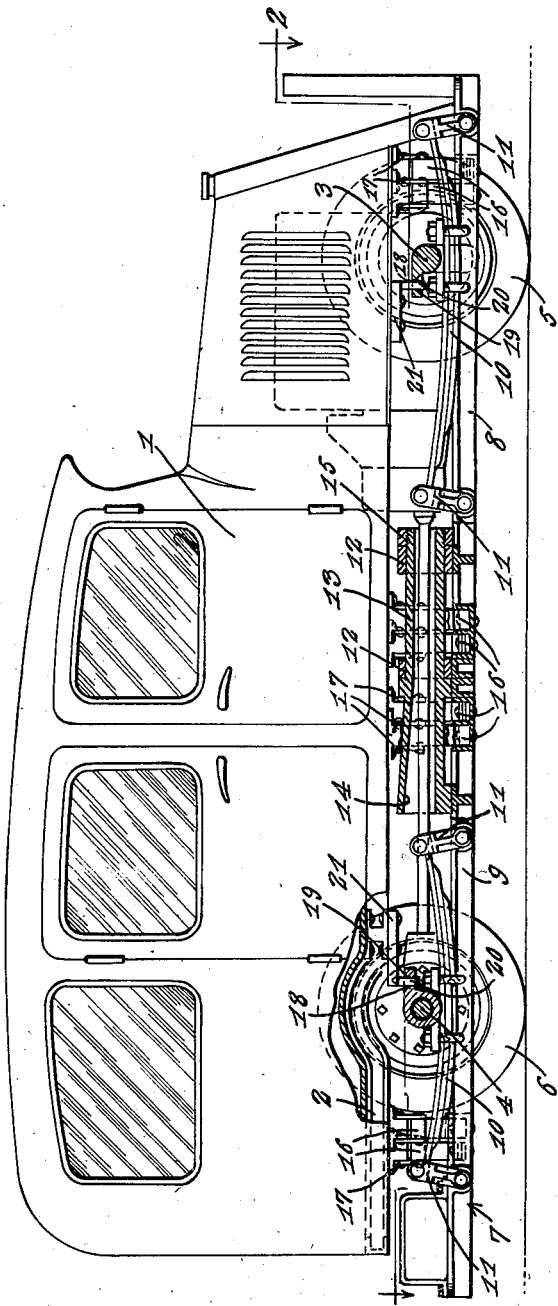

April 26, 1938.   B. C. SEATON   2,115,045
VEHICLE FRAME AND BODY MOUNTING CHASSIS
Filed July 24, 1936   2 Sheets-Sheet 2
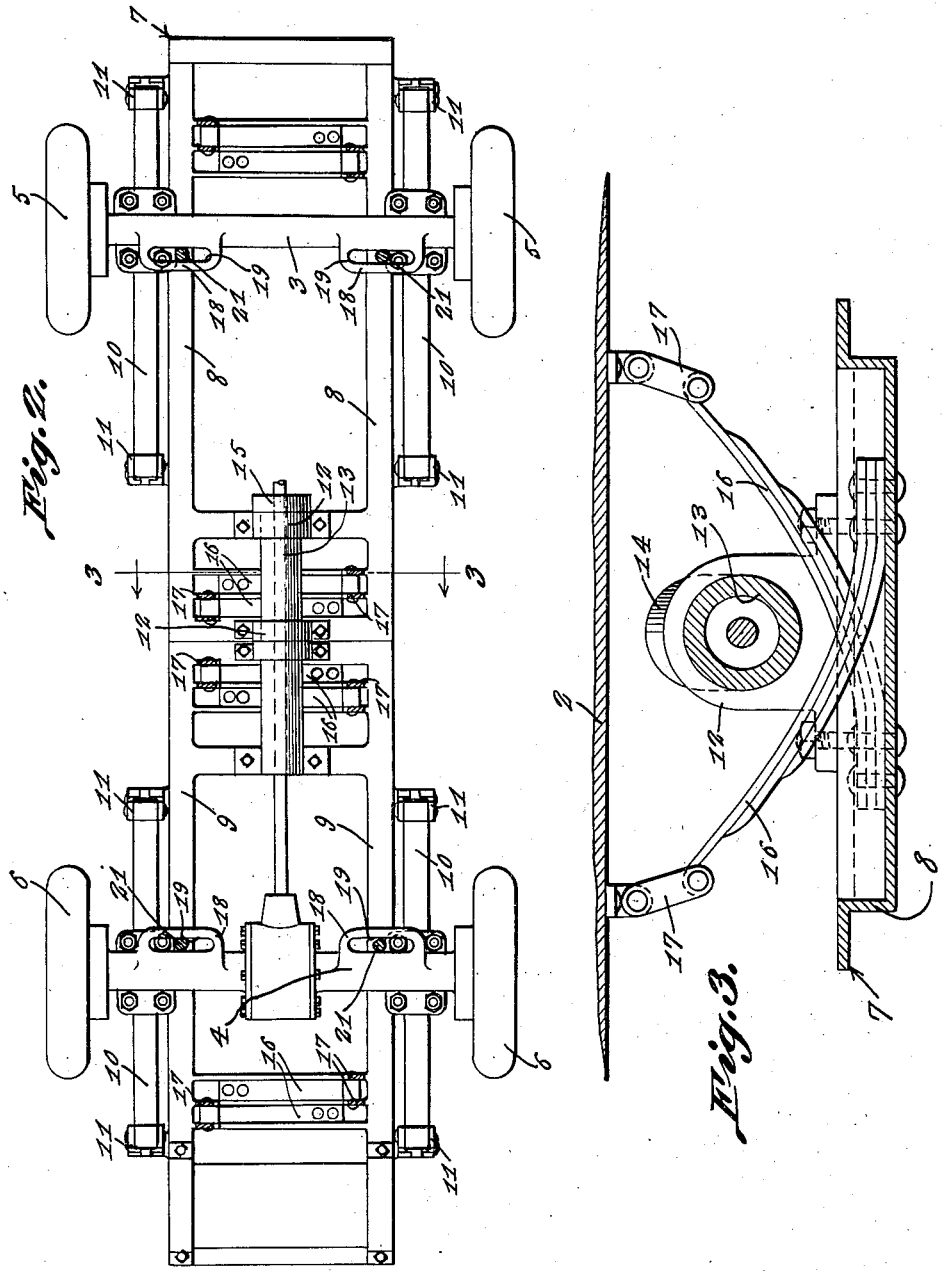
Benjamin C. Seaton, INVENTOR
BY Victor J. Evans & Co.
ATTORNEYS Patented Apr. 26, 1938

2,115,045

UNITED STATES PATENT OFFICE 2,115,045

VEHICLE FRAME AND BODY MOUNTING CHASSIS

Benjamin C. Seaton, Nashville, Tenn.

Application July 24, 1936, Serial No. 92,421

6 Claims. (Cl. 280—106.5)

This invention relates to motor vehicle construction and has for the primary object the provision of means for materially lowering the center of gravity of a vehicle and for reducing to a minimum side sway of said vehicle and for maintaining the body substantially level under varying road conditions and for reducing to a minimum road shocks to the body, thereby increasing riding comforts and safety to the vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a motor vehicle construction constructed in accordance with my invention.

Figure 2 is a plan view, partly in section, showing the chassis construction of the vehicle taken on the line 2—2 of Figure 1.

Figure 3 is a transverse sectional view taken on the line 3—3 of Figure 2.

Referring in detail to the drawings, the numeral 1 indicates a motor vehicle body and 2 a body frame. The numerals 3 and 4 indicate the front and rear axles of the motor vehicle and the axles are supported by the front and rear wheels 5 and 6. The foregoing description sets forth a conventional construction in motor vehicles and to which my invention is adapted.

A frame or chassis 7 underlies the front and rear axles and includes front and rear sections 8 and 9. Secured to the front and rear axles are vehicle springs 10. These springs have the ends thereof connected to the chassis by shackles 11. The shackles are pivoted both to the springs 10 and to the chassis. The springs 10 extend longitudinally of the vehicle and the front springs are connected to the front section 8 while the rear springs are connected to the rear section 9 of the chassis.

The adjacent ends of the sections 8 and 9 of the chassis are equipped with journals 12 which rotatably receive a sleeve 13, one end of which is flared, as shown at 14, and the other end is screwthreaded to receive thereon a stop collar 15. The sleeve rotatably connects the sections 8 and 9 and also allows the drive shaft of the motor vehicle to extend therethrough, as clearly shown in Figure 1.

Springs 16 connect the body frame to the chassis and are arranged transversely of said chassis. One end of each spring is fixed to the chassis while the opposite end is connected to the body frame by a shackle 17. The springs 16 are grouped in pairs and the springs of each pair extend in opposite directions. The springs 16 are of the cantilever type.

A construction of the character described will provide to a motor vehicle springs extending both longitudinally and transversely of the chassis of the vehicle, the springs 10 acting to absorb shocks and jars from the axles to the chassis and the springs 16 acting to absorb shocks and jars from the chassis to the body frame. Consequently, any road shocks or jars will be substantially absorbed before reaching the body of the vehicle thereby materially increasing the riding comforts of the vehicle. Furthermore, a vehicle of this construction will have side sway reduced to a minimum due to the fact that the springs 16 are arranged transversely of the chassis and the springs 10 arranged longitudinally thereof. By reducing side sway of the body of the vehicle to a minimum will render the vehicle safer in operation.

Plates 18 are formed on the front and rear axles and have slots 19 arranged transversely of the vehicle to slidably receive pins 20 formed on brackets 21 secured to the main frame or chassis. The pins fitting in the slots permit free upward and downward movement of the frame and chassis relative to each other and will limit endwise movement of said frame and chassis relative to each other.

Having described the invention, I claim:

1. A motor vehicle construction comprising superimposed frames, the uppermost frame forming part of a motor vehicle body and the lowermost frame underlying axles of the motor vehicle, longitudinally extending springs secured to the axles, shackles connecting said springs to the lowermost frame, cantilever springs fixed to the lowermost frame and extending transversely of the latter, shackles connecting the cantilever springs to the uppermost frame, said cantilever springs being arranged in pairs and the springs of each pair extending substantially in opposite directions from their points of attachment to the lowermost frame.

2. A motor vehicle construction comprising superimposed frames, the uppermost frame forming part of a motor vehicle body and the lowermost frame underlying axles of the motor vehicle, longitudinally extending springs secured to the axles, shackles connecting said springs to the lowermost frame, cantilever springs fixed to the lowermost frame and extending transversely of the latter, shackles connecting the cantilever springs to the uppermost frame, said cantilever springs being arranged in pairs and the springs of each pair extending substantially in opposite directions from their points of attachment to the lowermost frame, and means connecting the uppermost frame to the axles whereby said uppermost frame may have a free up and down movement and a sidewise movement.

3. A motor vehicle construction comprising superimposed frames, the uppermost frame forming part of a motor vehicle body and the lowermost frame underlying axles of the motor vehicle, longitudinally extending springs secured to the axles, shackles connecting said springs to the lowermost frame, cantilever springs fixed to the lowermost frame and extending transversely of the latter, shackles connecting the cantilever springs to the uppermost frame, said cantilever springs being arranged in pairs and the springs of each pair extending substantially in opposite directions from their points of attachment to the lowermost frame, and means connecting the uppermost frame to the axles whereby said uppermost frame may have a free up and down movement and a sidewise movement, said lowermost frame including sections arranged in endwise relation, and means for rotatably connecting the sections of the lowermost frame.

4. In combination with a rigid frame and axles extending transversely thereof and located in a plane below said frame, a second frame underlying the axles and paralleling the rigid frame and including sections movable relative to each other, springs connecting the axles to the second frame, and springs connecting said frames and arranged at right angles to the first springs.

5. In combination with a rigid frame and axles extending transversely thereof and located in a plane below said frame, a second frame positioned under the axles and including sections, means rotatably connecting the sections to permit either section to turn about a longitudinal axis of the second frame, springs supporting the second frame from said axles, and springs connecting the frames.

6. In combination with a rigid frame and axles extending transversely thereof and located in a plane below said frame, a second frame positioned under the axles and including sections, means rotatably connecting the sections to permit either section to turn about a longitudinal axis of the second frame, springs supporting the second frame from said axles, and cantilever springs arranged transversely of said frames and fixed on said second frame and pivotally connected on said first frame.

BENJAMIN C. SEATON.